United States Patent Office 2,726,475
Patented Dec. 13, 1955

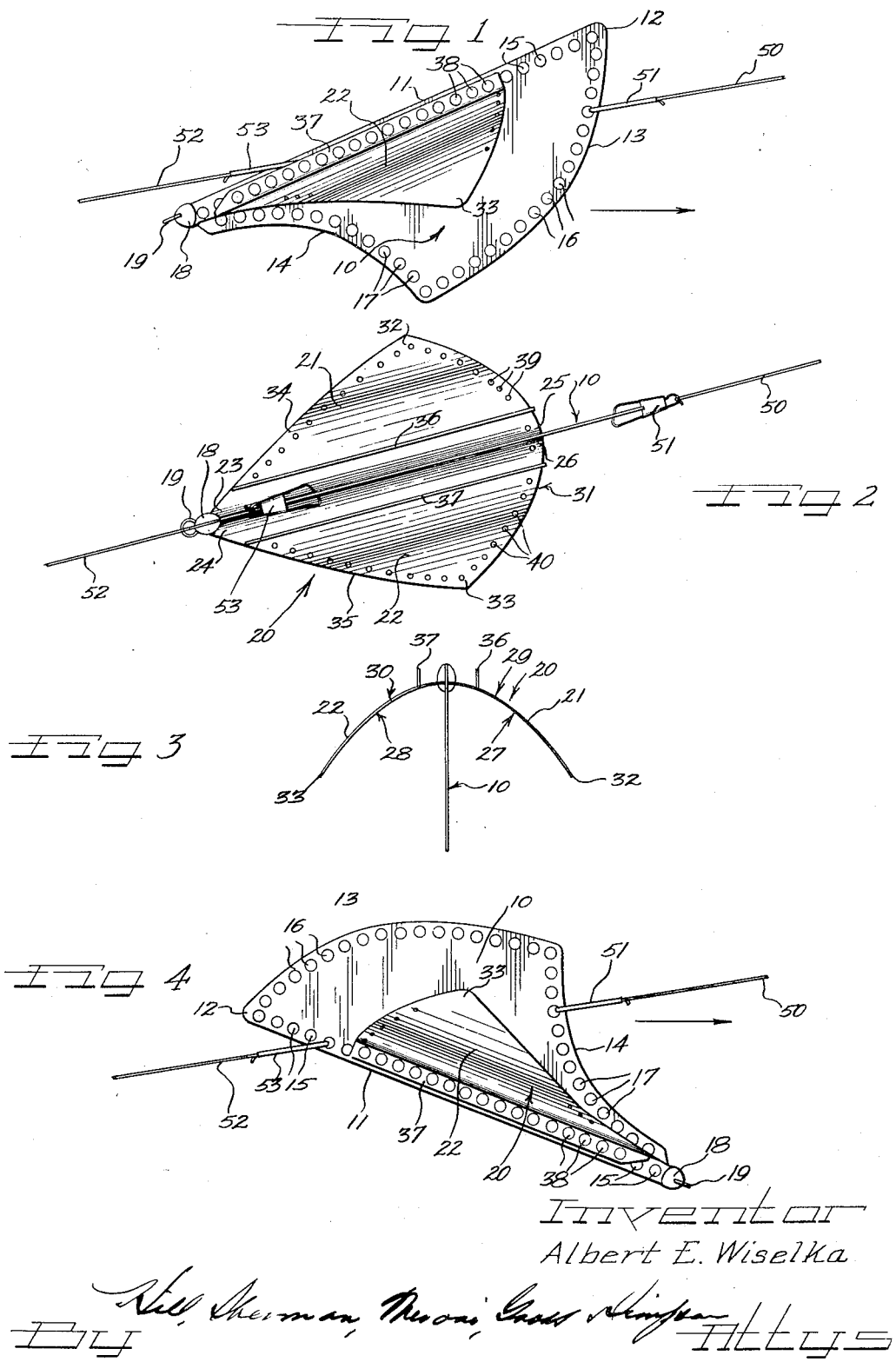

2,726,475

LINE LURE GUIDE

Albert E. Wiselka, Sheridan, Wyo.

Application October 16, 1953, Serial No. 386,468

6 Claims. (Cl. 43—43.13)

The present invention relates to a line lure guide and more particularly to an article of fishing tackle operable as a line lure guide and kite member.

Angling in running streams or the like and trolling in various waterways are often unsuccessful fishing ventures since these methods frequently require reasonably good depth control of the lure or bait. To overcome this problem there have been devised numerous types of sinkers and floats which have been accompanied with more or less success for their individual functions. In general, however, most of these heretofore known types of sinkers and the heretofore known types of floats have been not only restricted to their individual functions but have enjoyed only limited success since they are generally preset in their sinking or floating characteristics. Employment of such devices as those heretofore known in this art are permitted little or no versatility in depth control and little or no versatility with respect to water speed such as the flow rate of the stream or the towing rate of a boat or a ship or the like. Further, the previously known types of devices of the class described were single purpose devices and required the use of additional fish luring members such as artificial lures or bait or the like.

Another problem which confronted proper enjoyment and utilization of the previously known devices of this class, was their general inability to guide the line and laterally displace it with respect to the direction of water travel. This limitation often is a severe one since it requires fishermen to stand or travel in midstream and further does not permit angling in a relatively swift moving stream or trolling by a group of fishermen.

All of these difficulties and problems are obviate by the novel features and principles of the present invention. A line lure guide embodying the principles of the present invention is a highly versatile device operative to float and sink as well as to guide the line to a position transverse from the line of travel or stream flow. Further, in accordance with the principles of the present invention, a line lure guide is further operable as a lure to which a hook or the like may be attached directly thereby obviating any need for a separate lure or bait member.

Line lure guides and the like embodying the principles of the present invention are effectively adjustable whereby they will maintain the bait or lure at a preselected level in the water and are further adjustable to compensate for weight and rate of flow and rate of travel and the like.

It is, therefore, an important object of the present invention to provide a line lure guide and the like that is selectively operable to float and sink.

Another important object of the present invention is to provide a line lure guide operable in accordance with flow foil principles thereby to selectively float and sink in a controllable manner.

Another important object of the present invention is to provide an article of fishing tackle of the class described with means for adjustably connecting the same to a tow line or the like whereby to adjustably control the position of the same with respect to both depth and lateral position irrespective of stream flow rate or trolling speed or the like.

Still another object of the present invention is to provide an article of fishing tackle of the class described with a principal dorsal fin member and a pair of concave convex ventril fin members secured adjacent to one edge of the dorsal fin member and a pair of secondary dorsal fin members secured to the convex side of the ventral fin members respectively, each of the several members having a line connecting means whereby the article floats, sinks and laterally guides lines secured thereto.

Still other objects, features and advantages of the present invention will become readily apparent from the following specification, from the claims, and from the accompanying drawings illustrating a preferred embodiment of the present invention and fully and completely disclosing each and every detail shown thereon, in which like reference numerals refer to like parts, and in which:

Figure 1 is a side elevational view of a line lure guide embodying the principles of the present invention and connected to lines for floating the same;

Figure 2 is a top plan view of the line lure guide illustrated in Figure 1, connected as in Figure 1;

Figure 3 is a front elevational view of the same line lure guide; and

Figure 4 is a side elevational view of this same line lure guide connected for sinking.

In accordance with the principles of the present invention the line lure guide of the preferred embodiment illustrated in these drawings is equipped with a primary dorsal fin member 10 constructed from any desired material but preferably from a substantially rigid and strong material which is insoluble in water or salt water or the like and which has a specific gravity greater than the specific gravity of water. A preferred material is a non-corrosive or non-corrsively coated metallic substance.

The primary dorsal fin 10 is also preferably formed of sheet material in such a manner that it has a relatively straight upper edge 11 joined at the leading extremity 12 thereof by a rising preferably substantially exponentially curved leading edge 13, and joined at the other end thereof by a preferably substantially exponentially curved trailing edge 14 as shown in Fig. 3. Thus, the general form of the primary dorsal fin 10 is substantially triangular and provided with the upper edge 11 thereof substantially straight. The precise forms described for the several edges 11, 13 and 14 are not critical to the present invention but are preferred therefore since these described curvatures permit more efficient depth control.

In a marginal portion along the peripheral edges 11, 13 and 14 of the primary dorsal fin 10, a plurality of relatively closely spaced apertures are provided and identified generally by the numeral 15 along the upper edge 11, by the numeral 16 along leading edge 13, and by the numeral 17 along the trailing edge 14. Further, a balance weight or the like 18 is secured to the primary dorsal fin member 10 at the junction of the edges 11 and 14 and carries a small hook or loop or the like 19 rearwardly.

A ventral fin assembly 20 includes a pair of ventral fin members 21 and 22 secured to opposite sides of the dorsal fin 10 adjacent to the upper edge 11 and preferably immediately below the line of apertures 15. Further, these dorsal fin members, which are formed of preferably the same material of which the dorsal fin 10 is formed, are secured to the dorsal fin 10 so that their trailing extremities, as at 23 and 24 respectively engage the balance weight member 18 and so that their leading extremities 25 and 26 respectively are somewhat rearward of the leading extremity 12 of the dorsal fin 10 as seen in Fig. 1.

Each of the ventral fin members of the ventral fin assembly 20 are formed to have a concave-like lower face, as at 27 and 28 respectively, and to have a convex-like upper face as at 29 and 30 respectively. The concave-like lower faces 27 and 28 face generally towards the dorsal fin 10, as in Figure 3, while the convex upper faces 29 and 30 face outwardly therefrom. With this construction the ventral fin assembly 20 has a generally parabolic cross-sectional configuration or front elevational configuration as viewed in Figure 3.

The configuration of the ventral fin assembly 20 presents a curvilinear construction having a generally parabolic or the like leading edge 31 and is bisected by the dorsal fin member 10. From the lateral extremities of the leading edge 31, as indicated at 32 and 33 on the fins 21 and 22 respectively, the trailing edges taper to a point-like engagement with the balance weight 18. These trailing edges 34 and 35 are also preferably slightly outwardly bowed or arcuate as illustrated to provide the ventral fins 21 and 22 with better planing surfaces as hereinafter further described.

A pair of secondary dorsal fin members 36 and 37 are secured to the convex surfaces of the ventral fins 21 and 22 respectively preferably in planes parallel to the plane of the primary dorsal fin 10 and substantially equidistant therefrom. The secondary dorsal fin members 36 and 37 are secured to the ventral fins 21 and 22 relatively close to the junctions thereof with the dorsal fin 10 and extend for the full length of the ventral fins along their intersection lines therewith. The spacing of the secondary dorsal members 36 and 37 from the opposite sides of the primary dorsal fin 10 is slightly greater than the individual height of the secondary dorsal members 36 and 37. The height of the individual secondary dorsal members is sufficient, however, for them to each be provided with a plurality of lure line guide securing apertures 38 which are provided in each thereof substantially along the entire length of each thereof.

Further securing apertures 39 and 40 are provided in each of the ventral fin members 21 and 22 along the marginal portion of the peripheral edge thereof and particularly along the edges 31, 34 and 35.

Attention is directed to Figure 1 wherein the lure line guide embodying the principles of the present invention is illustrated in side elevational view and wherein the same as is illustrated as connected for floating or rising guidance of the lines connected thereto. When it is so desired to utilize the lure line guide of this invention in the vicinity of the surface of the stream or other waterway which is flowing or in which the lines are being towed as in trolling, the tow line 50 is secured to the leading edge 13 of the primary dorsal fin 10 by any convenient means such as a snap hook or clip or the like 51 fastened to one of the securing apertures 16. A drag member such as a lure or a bait or the like is secured to one of the apertures 15 in the upper marginal edge 11 of the dorsal fin 10 by a drag line or the like 52 fixed to such selected one of the apertures 15 by a second hook or clip or the like 53. Secured in this position for towing or operation in a relatively moving stream or the like the lure line guide of this invention will plane raising the lines up to and maintaining the same in a position in the vicinity of the surface of the water substantially directly in line with the direction of towing or with the direction of stream flow. The water will be cupped into the curvilinear ventral fins and specifically against the concave faces 27 and 28 thereof directing the water downward and directing the lure line guide or kite upwardly. An additional force, frequently known as lift, results from turbulence over the upper or convex surfaces 29 and 30 of the ventral fins 21 and 22 and further tends to raise the lure line guide. The precise positions of the clips 51 and 53 is not fixed on the lure line guide since by the provisions of the several apertures indicated at 15 and 16 permits adjustment in accordance with the towing speed or stream speed or the like or adjustment with respect to the desired depth which the lure line guide is to be maintained. As an example, raising the clip 51 to the uppermost aperture 16 in Fig. 1 will operate to keep the lower line guide at a relatively intermediate depth while fixing the clip into a lower aperture 16 will operate to increase the tilt angle of lure line guide and thereby tend to create a greater floating effect raising the same substantially close to or actually onto the surface of the water. To effect a transverse movement of the lure line guide and the lines attached thereto transversely away from the direction of the tow or fluid flow may be effected by fastening the clip 53 to one of the apertures 38 in either of the secondary dorsal fins 36 and 37 depending upon the desired direction. For example, fastening the clip 53 into an aperture 38 in the dorsal fin 36, will tend to move the lure line guide counterclockwise as the same as viewed in Figure 2.

The lure line guide of this invention is also readily operable to sink the lines affixed thereto to any desired fluid depth and the connections for this arrangement is illustrated in Figure 4. Here, the tow line 50 is connected through the clip member 51 to any one of the apertures 17 adjacent what was the trailing edge 14 which has now become the leading edge. The drag line 52 is connected by means of the hook or the like 53 to any one of the apertures 15 adjacent the edge 11 which has now become the lower edge of the dorsal fin 10. In this position and with these connections a towing force by the tow line 50 or holding the lure line guide by the tow line 50 in a relatively moving stream or the like will effect water flow into the concave faces 27 and 28 of the ventral fins assembly 20 and the force therefrom will drive the lure line guide downwardly. Further, the turbulence over the convex surfaces 29 and 30 will create a partial vacuum beneath the convex faces increasing the downward force on the lure line guide. Again, transverse control may be effected by securing the drag line or lure or hook or the like 52 to one of the securing apertures 38 in either the secondary dorsals 36 and 37 depending upon the desired direction of transverse movement.

In some instances it is desirable to directly connect a lure or bait or hook or the like to an extremity of the lure line guide and provision is made therefor by the hook or loop 19 at the counterbalance weight 18. In addition a lure, bait or hook may be attached by means of any of the aforementioned apertures. The counterbalance weight 18 tends to maintain the guide 10 in its proper position such as illustrated in Figures 1 and 4 respectively.

It will also be readily seen that numerous variations and modifications may be made without departing from the true spirit and scope of the principles and novel concepts of the instant invention. I, therefore, intend by the claims to cover all such modifications and variations as fall within the spirit and scope of the novel concepts and principles of my invention.

I claim as my invention:

1. An article of fishing tackle of the class described, comprising, a curvilinear ventral fin assembly having an arcuate surface, a primary dorsal fin member secured to said ventral fin assembly substantially centrally thereof and longitudinally thereof, and a plurality of secondary dorsal fin members secured to said ventral fin assembly at opposite sides of said primary dorsal fin member, said dorsal fin members each including means adapted to secure other elements of fishing tackle thereto at preselected positions thereon whereby said article may rise, sink and laterally guide the said other elements secured thereto.

2. An article of fishing tackle of the class described, comprising, a primary dorsal fin member, ventral fins secured to opposite sides of said primary dorsal fin and adjacent to one edge thereof, and a secondary dorsal fin member secured to each of said ventral fins in proximity to said primary dorsal fin, said dorsal fin members each including means adapted to secure other elements of fishing tackle thereto at preselected positions thereon whereby said article may rise, sink and laterally guide the said other elements secured thereto.

3. An article of fishing tackle of the class described, comprising, a primary dorsal fin member, ventral fins secured to opposite sides of said primary dorsal fin and adjacent to one edge thereof, each ventral fin being rectilinear in one direction and being arcuate in a direction substantially perpendicular to said one direction thus forming a concave face and a convex face on each ventral fin and each fin being secured to said dorsal fin with the concave face thereof opening toward the dorsal fin member, and a secondary dorsal fin member secured to the convex face of each of said secondary ventral fins in proximity to said primary dorsal fin member, said dorsal fin members each including means to secure other elements of fishing tackle thereto at preselected positions thereon whereby said article may rise, sink and laterally guide the said other elements secured thereto.

4. An article of fishing tackle of the class described, comprising, a primary dorsal fin member having a substantially triangular configuration, a plurality of apertures adjacent to the peripheral edges of said primary dorsal fin member, a ventral fin assembly including a pair of arcuate ventral fin members secured to said primary dorsal fin members adjacent to one edge thereof and on opposite sides thereof, said ventral fin assembly having a concave surface and a convex surface and being secured to the dorsal fin member with the concave surface facing toward the dorsal fin member, and a secondary dorsal fin member secured to the convex surface of each of said ventral fin members.

5. An article of fishing tackle of the class described, comprising, a primary dorsal fin member having a plurality of apertures adjacent to the peripheral edges of said primary dorsal fin member, a ventral fin assembly including a pair of arcuate ventral fin members secured to said primary dorsal fin member adjacent to one edge thereof and on opposite sides thereof, said ventral fin assembly having a concave surface and a convex surface and being secured to the dorsal fin member with the concave surface facing toward the dorsal fin member, and a secondary dorsal fin member secured to the convex surface of each of said ventral fin members.

6. An article of fishing tackle of the class described, comprising, a primary dorsal fin member having a substantially straight upper edge and arcuate trailing and leading edges, a series of apertures in the marginal portion adjacent the peripheral edges of said primary dorsal fin member, a pair of ventral fins secured to opposite sides of said primary dorsal fin member adjacent to the substantially straight edge thereof and immediately below the line of marginal apertures along said edge, said ventral fin members each having a concave face facing toward said primary dorsal fin member and a convex face facing away from said dorsal fin member, and secondary dorsal fin members having a plurality of apertures therein, said secondary dorsal fin members being secured to each of said ventral fin members respectively substantially parallel to said primary dorsal fin member and substantially equidistant therefrom.

References Cited in the file of this patent
UNITED STATES PATENTS

| 780,029 | Flegel | Jan. 17, 1905 |
| 1,464,041 | Holcomb | Aug. 7, 1923 |
| 1,606,240 | Klaserner | Nov. 9, 1926 |
| 1,875,122 | Olson | Aug. 30, 1932 |
| 2,520,560 | Peeler | Aug. 29, 1950 |
| 2,566,029 | Louthan | Aug. 28, 1951 |
| 2,588,300 | Smith | Mar. 4, 1952 |